Nov. 16, 1965    H. O. SCHROTER    3,217,558
HAND BRAKE MECHANISM
Filed July 26, 1962

INVENTOR
HANS O. SCHROTER
BY Toulmin & Toulmin
ATTORNEYS

3,217,558
HAND BRAKE MECHANISM
Hans O. Schroter, Munich, Germany, assignor to Stopfix-Bremse Schroter & Co., Munich, Germany
Filed July 26, 1962, Ser. No. 212,647
1 Claim. (Cl. 74—516)

The hand brake mechanism of this invention has at least one multipart intermediate link which is part of the brake mechanism intermediate a hand brake lever and the friction brakes of a vehicle. The purpose of the intermediate link is to change the lever ratio so that as large a braking effect as possible is attained upon a relatively small displacement of the hand brake lever. In addition to that the operator of a vehicle equipped with this hand brake mechanism can operate the hand brake with a minimum of actuating force.

Consequently, the main object of the invention is to provide a hand brake mechanism by means of which a considerable breaking effect is attained by exerting relatively little braking force.

Another object of the invention is to provide a hand brake mechanism which is simple in construction, easily assembled and consisting of only a few robust parts.

Figure 1:
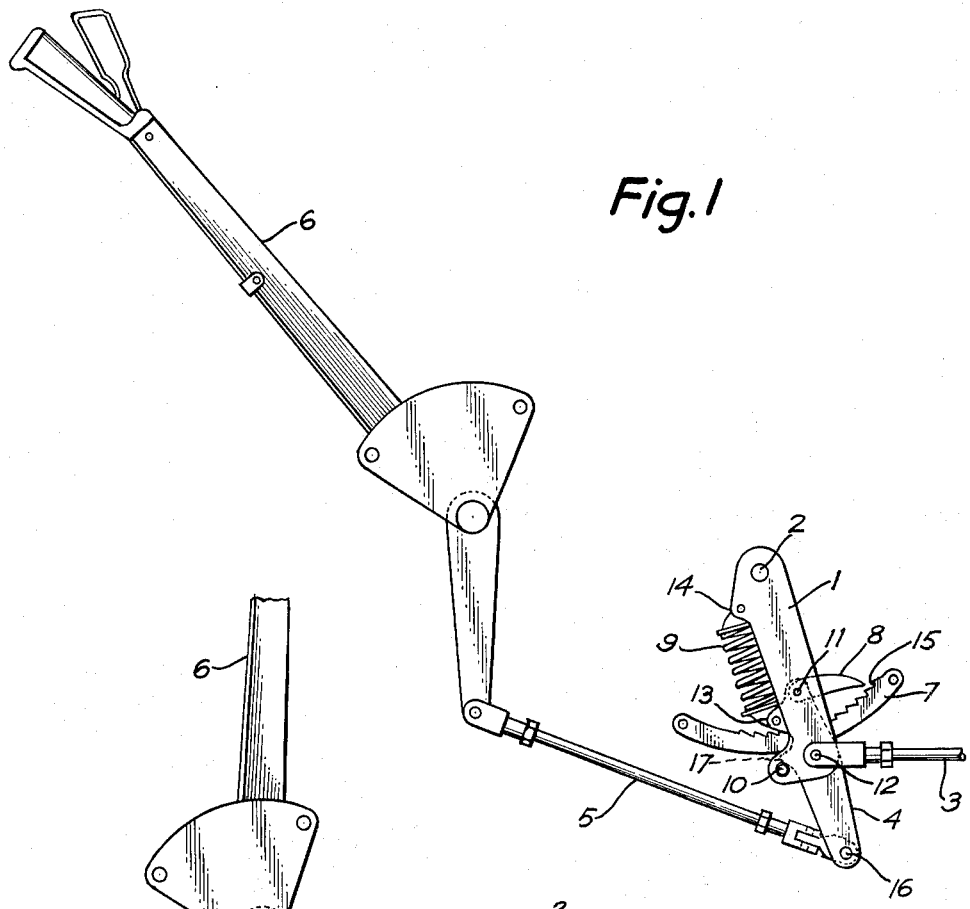
Figure 2:
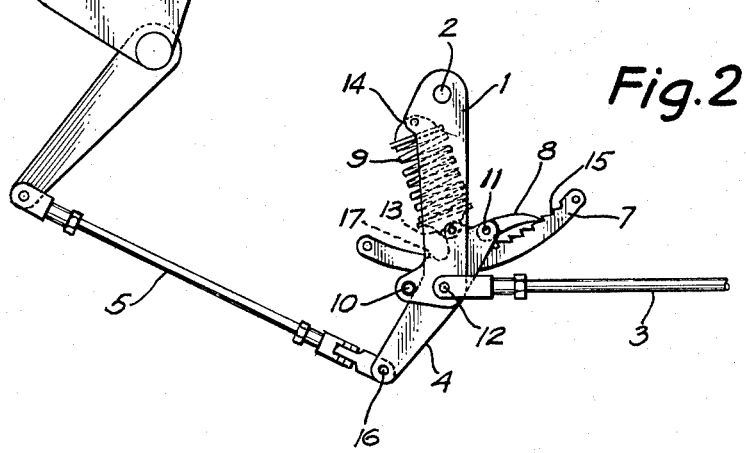

Other objects and advantages of the invention will be apparent upon reference to the accompanying description when taken in conjunction with the following drawings wherein:

FIGURE 1 is a side elevation of the hand brake mechanism in its released position; and FIGURE 2 is a side elevation of the hand brake mechanism in its actuated position.

Referring now to the drawings wherein like reference characters designate like parts throughout the views, the assembly shown in FIGS. 1 and 2 includes a lever part 1 rockable on a stationary pivot 2. The lever part 1 is directly connected at the pivot 12 with a linkage member 3 leading to the friction brake means. A lever member 4 is pivoted at the pivot point 12 to the lever part 1. The lever member 4 is pivotally connected on its outer end at pivot 16 with the rod 5 which in turn is operatively connected with the hand brake lever 6. The inner end of the pivotally journalled lever member 4 carries an elastic holding pawl 8 which is pivoted thereto at pivot 11. The holding pawl 8 is adapted to engage into a tooth of a toothed segment 7 which is stationary arranged concentrically below the stationary pivot 2, when the lever member 4 which is operatively connected with the hand brake lever 6 is rocked. Upon rocking of the lever member 4, the pretensioning of a spring 9 is overcome. The spring 9 is pivotally attached with its upper end to a projection 14 of the lever part 1, and with its lower end it is pivotally attached to a nose 13 of the lever member 4. By means of the pretensioning of spring 9 the nose 17 of the lever member 4 is firmly pressed against the abutment 10 at the lower end of the lever part 1. Thereby the lever part 1 is kept in alignment with the lever member 4.

The holding pawl 8 forms with the length of the lever member 4 an angle of at least 80°.

It is another characteristic of the improved hand brake mechanism that the spring 9 intermediate the lever part 1 and the lever member 4 goes through its dead center position when the two lever members are rocked against each other and the holding pawl 8 has been moved into engagement with the toothing of the toothed segment 7.

In a preferred embodiment of the invention the pivot 12 between the two lever segments is arranged inside the toothed segment which is preferably provided with internal toothing 15.

The hand brake mechanism according to the invention allows the attainment of a considerable braking effect upon insignificant displacement of the hand brake lever in that a low lever ratio at first overcomes the play in the mechanism. In this connection it is without significance how the brake linkage is adjusted because the greater lever ratio is not initiated in dependence of the linkage but results from the increasing resistance of the brake shoes. The transformation of force in the hand brake mechanism is larger than the transformation of displacement, and the transformation of force increases constantly. When this happens the tension of the spring compensates a rapid increase of the transformation of displacement in the transformation of force. It is important to point out that the improved hand brake mechanism is simple in construction, easily assembled and consists of only a few strong parts whereby the structure becomes very durable.

If the hand brake lever 6 is rocked clockwise, the two lever segments 1 and 4 are first moved as a unit about the stationary pivot 2. When this movement occurs, a low lever ratio is effective in the linkage member 3 and rod 5. The play in the system is also overcome. As soon as the brake shoes are in engagement and a substantial counter force becomes effective in the linkage member 3, the tension of the spring 9 is overcome and the lever member 4 further rocks relative to the lever part 1, also clockwise. Thereby the holding pawl 8 moves into engagement with an adjacent tooth of the toothed segment 7 so that the lever member 4 receives an additional firm support by the holding pawl 8 (FIG. 2). The transformation of displacement has now suddenly increased. Upon further rocking of the lever member 4 relative to the lever part 1, the tension of the spring 9 is increased until the spring has attained its greatest tension in a dead center position. Thereafter, the spring 9 is released and supports the actuating force exerted upon the hand brake lever 6.

By the described effect of the spring 9 the sudden increase of the transformation of displacement after the engagement of the holding pawl 8 in the transformation of force is avoided, because after the engagement of the holding pawl 8 only the tension of the spring 9 increases at first. The fact that the holding pawl 8 forms with the lever member 4 an angle of at least 80° has the result that the transformation of displacement also increases constantly after the engagement of the holding pawl 8.

Upon releasing the brake, the spring 9 is returned beyond its dead-center position. This is caused by the tension in the linkage member 3 resulting from the reaction force of the brake shoes. Thereafter, the lever member 4 reassumes its released position (FIG. 1) where the holding pawl 8 is out of engagement with the toothed segment 7.

In FIGS. 1 and 2 the pivot point between the two lever segments 1 and 4 is shown outside of the toothed segment 7. In order to render the structure more compact it is also possible to provide said pivot within the toothed segment 7, which arrangement does not result in any change of operation.

It will be understood that this invention is susceptible to modification in order to adapt it to different usages and conditions and, accordingly, it is desired to comprehend such modifications within this invention as may fall within the scope of the appended claim.

What is claimed is:

In a hand brake mechanism having a multipart intermediate lever operatively connected with hand brake means and friction brake means, respectively, for changing the lever ratio, the combination comprising a lever part, a stationary first pivot pivotally supporting said lever part at one end thereof, a link member for operative connection with said friction brake means, said lever part being pivotally connected at its other end to the mid-portion of a lever member and to said link member, said lever member being supported for rocking movement about said pivotal connection, the lower end of said lever member being pivotally connected by means of a rod to said hand brake lever means, a pawl pivotally connected to the upper end of said lever member, a fixed toothed segment arranged concentrically to said stationary first pivot, said toothed segment being positioned intermediate the ends of both said lever part and said lever member, said pawl being adapted to engage into said toothed segment upon rocking the lever member relative to the lever part, and a pretensioned spring interconnected between said lever member and said lever part, and operating to hold the lever member out of dead center position, and into either brake or a brake off position upon rocking the lever member, and abutment means on said lever part engageable by said lever member to limit relative movement between the lever member and lever part.

References Cited by the Examiner

UNITED STATES PATENTS

| | | | |
|---|---|---|---|
| 914,277 | 3/1909 | Howe | 74—518 X |
| 1,291,664 | 1/1919 | Von Schrenk | 74—518 |
| 2,464,097 | 3/1949 | Orschelm | 74—518 |
| 2,985,032 | 5/1961 | Schröder et al. | 74—536 |

FOREIGN PATENTS

| | | |
|---|---|---|
| 507,391 | 6/1920 | France. |
| 1,048,493 | 1/1959 | Germany. |
| 450,394 | 7/1936 | Great Britain. |
| 884,530 | 12/1961 | Great Britain. |

BROUGHTON G. DURHAM, *Primary Examiner.*